Aug. 4, 1959

R. W. BUSHMEYER

2,897,903

DRAFT-PROPELLED IMPLEMENT

Filed Jan. 12, 1953

INVENTOR
Richard W. Bushmeyer
BY
ATTORNEY

United States Patent Office 2,897,903
Patented Aug. 4, 1959

2,897,903

DRAFT-PROPELLED IMPLEMENT

Richard W. Bushmeyer, Rockford, Ill., assignor to J. I. Case Company, Racine, Wis., a corporation of Wisconsin Application January 12, 1953, Serial No. 330,828

18 Claims. (Cl. 172—263)

The present invention relates generally to tractor mounted implements and more particularly to a plow which is connected to a tractor by means of a draft and lifting connection.

The object and general nature of the present invention is the provision of an implement which is connected to the tractor by means of a draft and lifting connection and which is particularly designed for permitting the implement to swing from side to side while being so connected to the draft and lifting connection. More particularly it is a feature of this invention to provide a plow adapted to be integrally connected to a tractor by means of a draft and lifting connection and which is permitted to swing from side to side while being so connected to the draft and lifting connection, suitable inter-engaging means being provided between the plow and the draft and lifting connection for draft connecting the plow to the tractor while permitting the plow, upon the plow bottom's striking an obstruction, to release itself from the draft and lifting connection upon relative longitudinal movement between the plow and the tractor in one direction. It is a further feature of this invention to provide in a plow of this type suitable interlocking means for stabilizing the plow with respect to the draft and lifting connection for permitting tilting of the plow upon adjustment of the draft and lifting connection, while providing means for limiting the sideward swinging movement of the plow in either direction to a predetermined extent, said interlocking means and the last mentioned means being instantaneously releasably from the plow upon relative longitudinal movement between the plow and the tractor. Further, it is a feature of this invention to provide a quick attachable connection for draft connecting said plow with respect to said tractor, which connection accommodates any necessary or desirable swinging from side to side of the implement relative to the tractor after the connection has been made.

A still further object of the present invention is to provide a hitch for integrally mounting an implement, having a ground working tool on a tractor, said hitch being effective for causing said ground working tool to follow in the same relation to the path of travel of the tractor whether said path of travel is straight or curved.

These and other objects and advantages of the present invention will be apparent to those skilled in the art after a consideration of the following detailed description taken in conjunction with the accompanying drawings in which the preferred form of the present invention has been illustrated.

Figure 1:
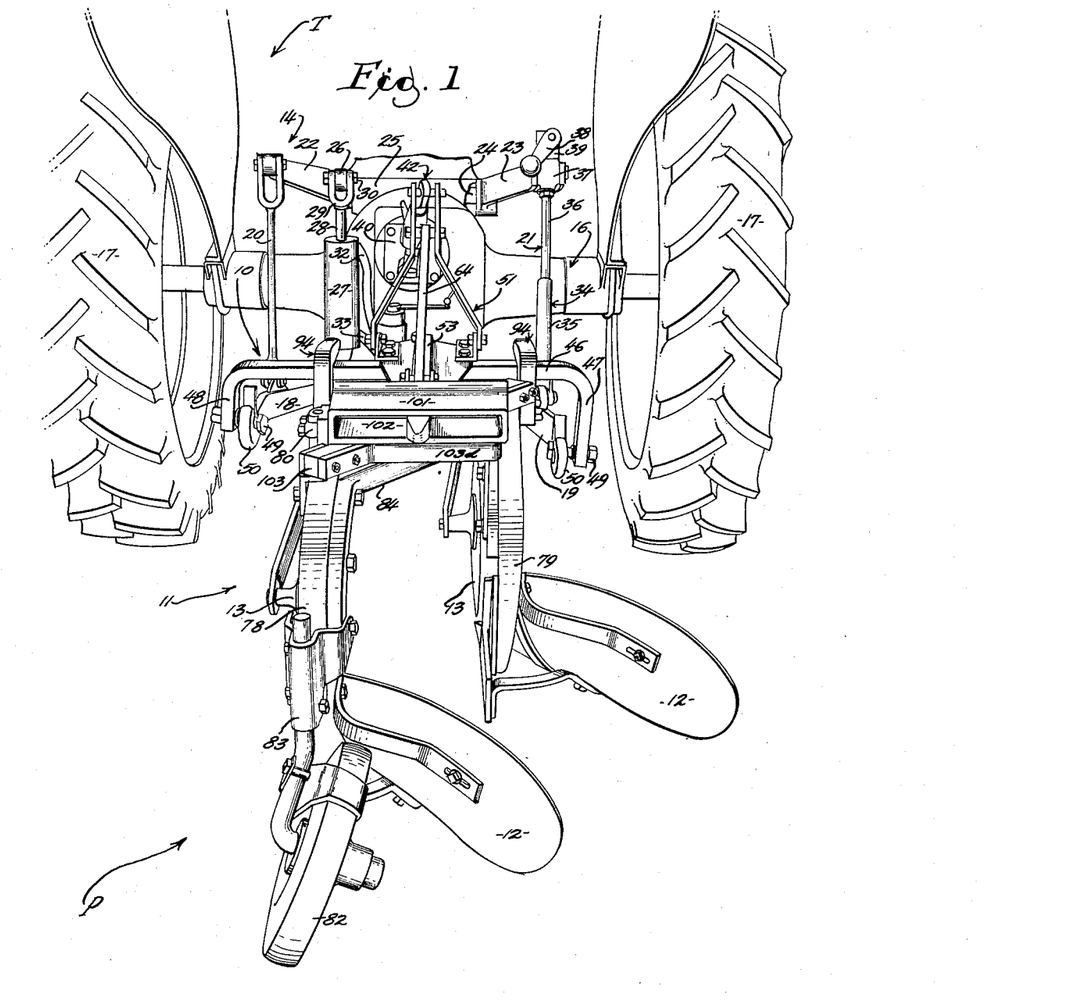
Fig. 1 is a rear perspective view of an implement embodying the present invention mounted on a tractor and with parts broken away to more clearly show details of construction.
Figure 2:
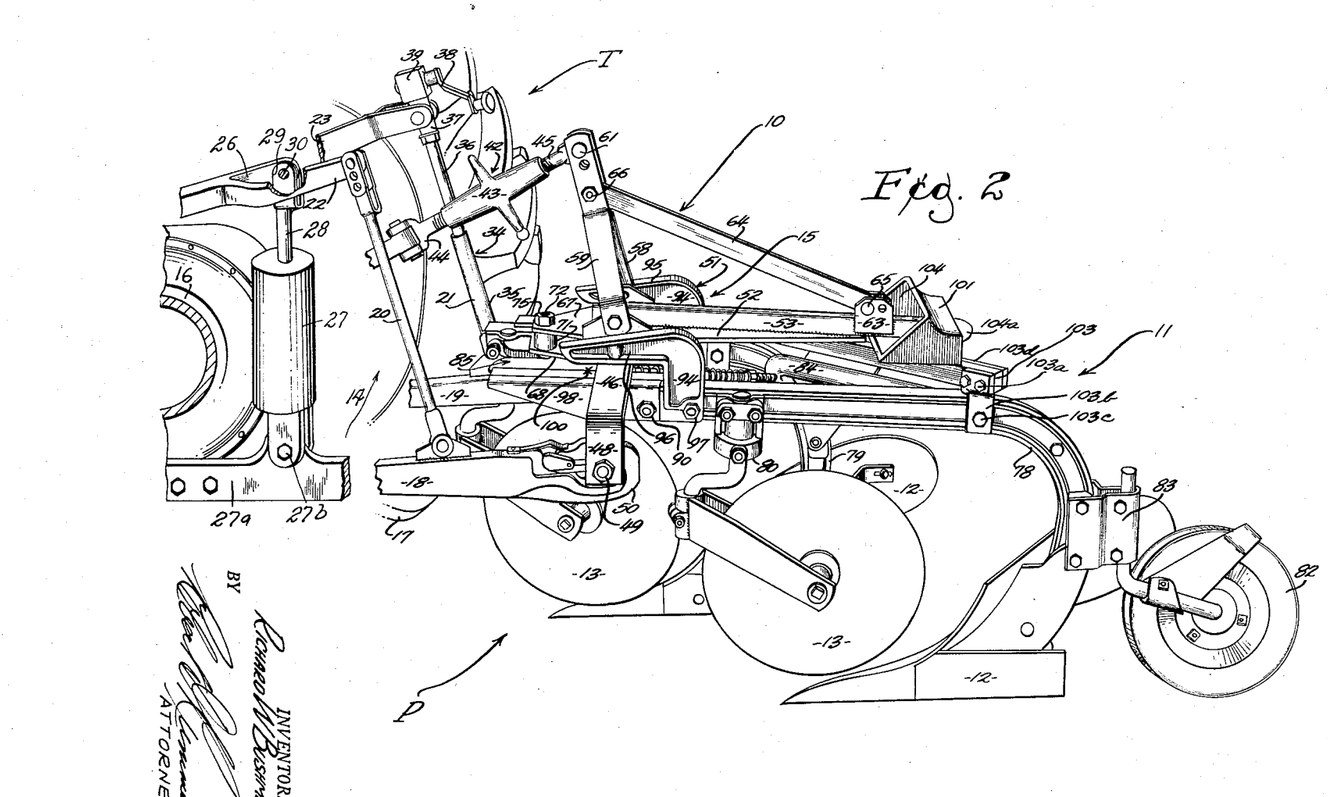
Fig. 2 is a left rear perspective view of the combination shown in Fig. 1.
Figures 3, 9:
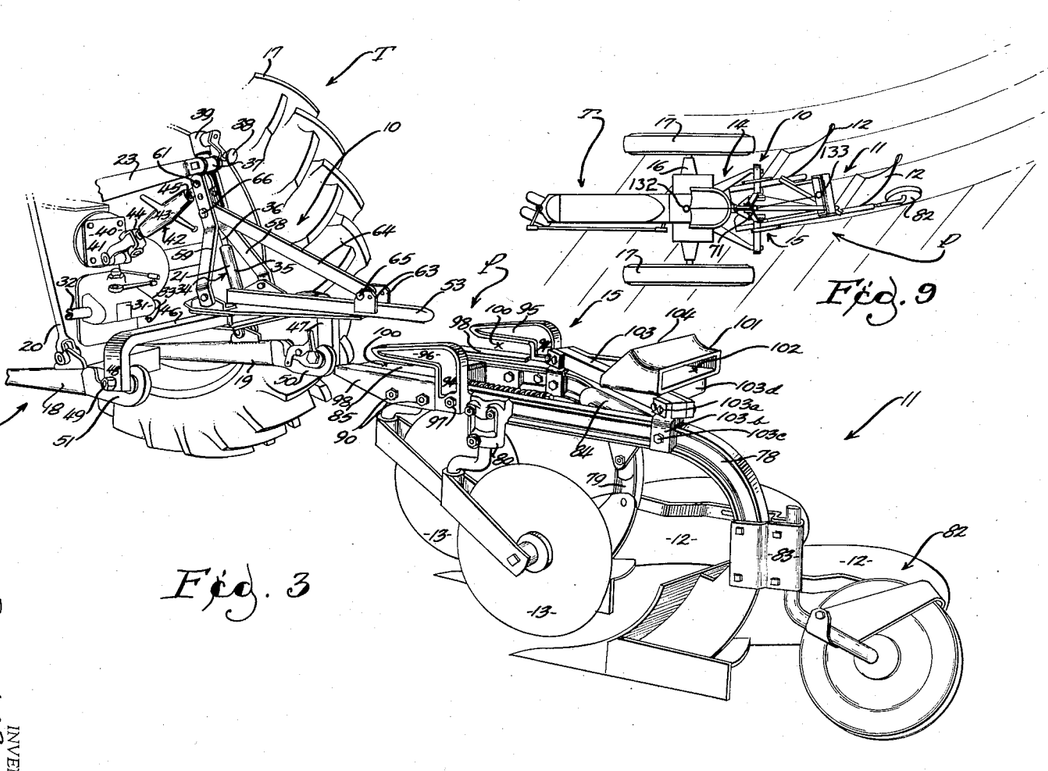
Fig. 3 is a view with parts removed similar to Fig. 2, showing the implement after a "break-away" has occurred.
Fig. 9 is a plan view of the combination shown in Fig. 1, reduced in size and with parts removed, illustrating the track ability of the implement behind the tractor.

The present invention is shown as being embodied in an agricultural implement such as a plow P which is adapted to be mounted on a tractor T which is associated with the plow as seen in Figs. 1, 2, and 3. The plow P can be considered as being formed of two subframes 10 and 11, the subframe 11 carrying the usual plow bottoms 12 and coulters 13, and the subframe 10 being adjustably carried by the tractor by means of a draft and lifting linkage 14 which is considered as a part of the tractor T. The plow P can also be considered as being formed only of the subframe 11, the subframe 10 being considered in this instance as a part of the tractor T. The subframe 11 is adapted to be releasably connected or inter-engaged with the subframe 10 so as to provide for releasing the subframe 11 from the subframe 10 in the event that more than a predetermined force is required to move the plow bottoms 12 through the ground, and interlocking means 15 are provided between the subframe 11 and the subframe 10 for stabilizing the subframe 11 with respect to the subframe 10 when the plow P is in an operative position with respect to the tractor T while still permitting lateral swinging movement of the subframe 11 with respect to the subframe 10 in both directions and instantaneous separation of the subframe 11 from the subframe 10 upon relative longitudinal movement therebetween as will be clearly explained hereinafter.

More specifically the tractor T can be of any suitable or conventional construction and preferably comprises in the present instance an engine or power source, a transmission, a rear axle housing 16 enclosing a rear axle assembly, not shown, and rear traction wheels 17 on opposite ends of the rear axle housing.

The draft and lifting linkage 14 as previously suggested is considered as a part of tractor T, and this linkage comprises in the present instance rearwardly extending hitch or draft arms 18 and 19, preferably of tubular construction, which are respectively secured in spaced apart relationship with the rear axle housing 16 of the tractor so that the hitch arms are free to swing into raised or lowered positions in substantially vertical planes in the manner disclosed in the patent to Clarke 2,865,657, filed May 29, 1950, and issued December 23, 1958. The hitch arms 18 and 19 are connected by means of suitable links 20 and 21 respectively to rearwardly extending rock arms 22 and 23 adjacent the rearward ends thereof, the rearwardly extending rock arms being in turn fixed to the opposite ends of a suitable rock shaft 24 which is rotatably journaled in a suitable housing 25. The rock arm 22 has a rearwardly extending rock arm 26 fixed thereto adjacent the housing 25, and a suitable hydraulic cylinder 27 is suitably anchored to some convenient part of the rear axle housing 16 as a bracket 27a, by means of a pivot 27b, Fig. 2, and in substantially vertical alignment with rock arm 26. The hydraulic cylinder is provided with an actuatable plunger 28 which carries adjacent the end thereof a suitable clevis 29, and the clevis 29 is pivotally secured to the arm 26 adjacent the rearward end thereof by means of a suitable attaching pin 30. The position of the plunger 28 with respect to the hydraulic cylinder 27 is controlled by means of a suitable hydraulic system carried by the tractor which includes a selector valve 31 and hydraulic hoses or conduits 32 and 33 leading from the selector valve to opposite ends of the hydraulic cylinder. The flow of hydraulic fluid from the selector valve 31 into the hydraulic cylinder 27 is under complete control of the operator from his station on the tractor, by any well known or suitable means, not shown, and the hitch arms 18 and 19 can be moved into a raised position by the admission of hydraulic fluid into the proper end of the cylinder so as to push the plunger 28 upwardly against the rock arm 26. The hitch arms 18 and 19 are biased to swing downwardly and this downward swinging movement is limited only by the position of the plunger 28 with respect to the hydraulic cylinder 27 and this is under complete control of the operator from his station on the tractor as previously suggested and is well-known in the art.

The link 21 is in the form of an adjustable screw 34. The adjustable screw 34 comprises in the present instance a threaded tubular member 35 swingably connected to the hitch arm 19 adjacent one end thereof and a threaded member 36 which is threadedly received in the member 35 and rotatably carried adjacent the upper end thereof in a swivel block 37 swingably carried adjacent the rearward end of the rock arm 23. Rotative movement is imparted to the threaded member 36 by means of a suitable handle 38 which is positioned within convenient reach of the operator from his station on the tractor and any conventional or suitable worm gearing arrangement, not shown, enclosed in a housing 39. It will be appreciated that the operator can by turning handle 38 in either direction move member 36 into or out of member 35 so as to lengthen or shorten the link 21 as desired. It will be further appreciated that the swinging movement imparted to hitch arm 19 by lengthening or shortening link 21 is independent of any swinging movement being imparted to the hitch arm 18 as will be more fully appreciated hereinafter.

A suitable bracket 40 is fixed to the rear axle housing 16 intermediate the hitch arms 18 and 19 and in a plane above the pivotal connections between the respective hitch arms and the rear axle housing, and a pin 41 swingably supports a middle link 42 from the bracket 40 for swinging in a substantially vertical plane and for permitting substantially vertical lifting movement of an implement attached thereto and to the respective hitch arms 18 and 19 upon upward swinging of the hitch arms 18 and 19 in a manner well-known in the art. The middle link 42 is adjustable in length employing a turn buckle 43, a threaded element 44, and a threaded element 45 so as to permit the operator from his position on the tractor to lengthen or shorten the middle link for well-known purposes.

Figures 4, 5:
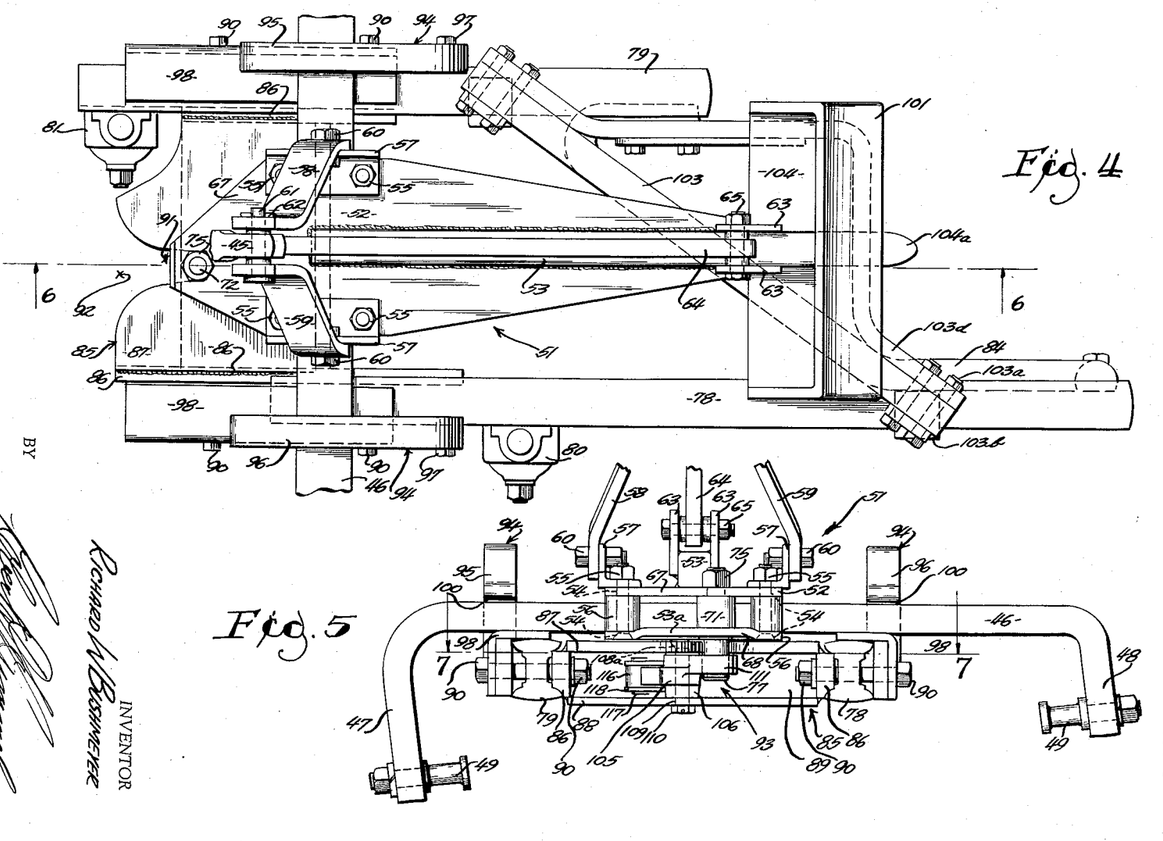
Fig. 4 is a plan view of the implement shown in Fig. 1, enlarged somewhat and with parts removed.
Fig. 5 is a front view of the implement shown in Fig. 4, with certain parts broken away.

The subframe 10, which can be considered as a part of plow P or tractor T as previously suggested, is of fabricated construction and includes in the present instance a draft beam 46, preferably formed of a rigid metal bar substantially rectangular in cross section and having downwardly bent end portions 47 and 48 respectively, see also Figs. 4 and 5. The downwardly bent portions 47 and 48 have fixed adjacent the lower ends thereof inwardly extending pins or trunnions 49, and the portions 47 and 48 are so spaced from each other as to position the pins 49 to be readily received by suitable attaching claws 50 carried adjacent the respective ends of the hitch arms 18 and 19. A pilot shaft and mast structure, designated generally by the number 51, is rigidly secured to the draft beam 46 and positioned substantially medially of the ends thereof. This structure comprises in the present instance a plate 52 positioned on top of draft beam 46 and extending forwardly and rearwardly therefrom, and that portion of the plate 52 extending rearwardly of the draft beam 46 is substantially triangular in shape and has fixed thereto as by welding or the like a rearwardly extending pilot shaft 53. The plate 52, which is formed of rigid sheet metal, is carried on top of the draft beam 46 and a second plate 53a is positioned against the undersurface of the draft beam 46. The plates 52 and 53a have formed therein aligned openings 54 on opposite sides of the draft beam 46 and suitable bolts 55 are received in the aligned openings 54 so as to clamp the plates 52 and 53a to the draft beam 46. Suitable spacers 56 are received by the bolts 55 between the respective plates 52 and 53a, and angular-shaped brackets 57 are secured to the plate 52 on opposite sides of the pilot shaft 53 by means of the bolts 55. The mast is fabricated from spaced apart members 58 and 59 which are secured to the angular-shaped brackets 57 by means of bolts 60. The members 58 and 59 extend upwardly therefrom and inwardly sufficiently to accommodate therebetween adjacent the upper ends thereof the threaded element 45, and suitable aligned openings are formed in the members 58 and 59 to secure therebetween by means of a pin 61 the threaded element 45 of the middle link. A cotter pin 62 is provided for well-known purposes. The pilot shaft 53 has secured thereto as by welding or the like upwardly extending attaching brackets 63, and a stabilizing link 64 is secured between the brackets 63 as by a bolt or the like 65. The other end of the stabilizing member 64 is secured between the mast members 58 and 59 below the pin 61 as by a suitable bolt or the like 66.

Figure 6:
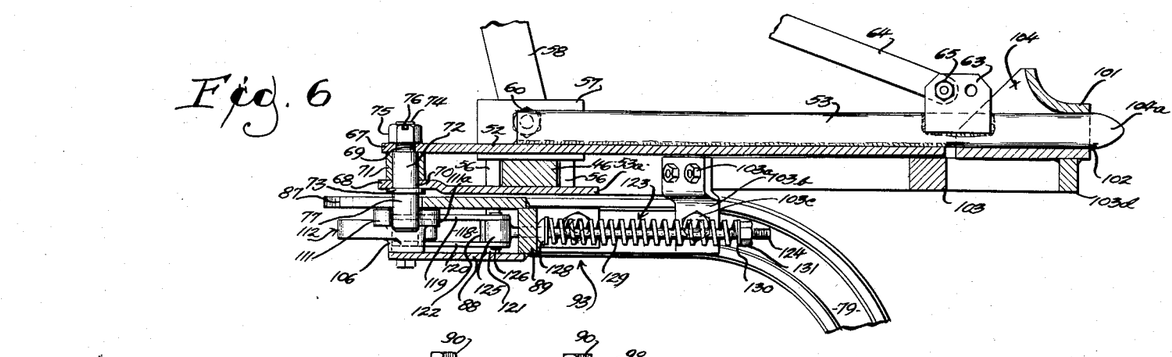
Fig. 6 is a right side sectional view taken on the line 6—6 of Fig. 4 with certain parts broken away.
Figure 7:
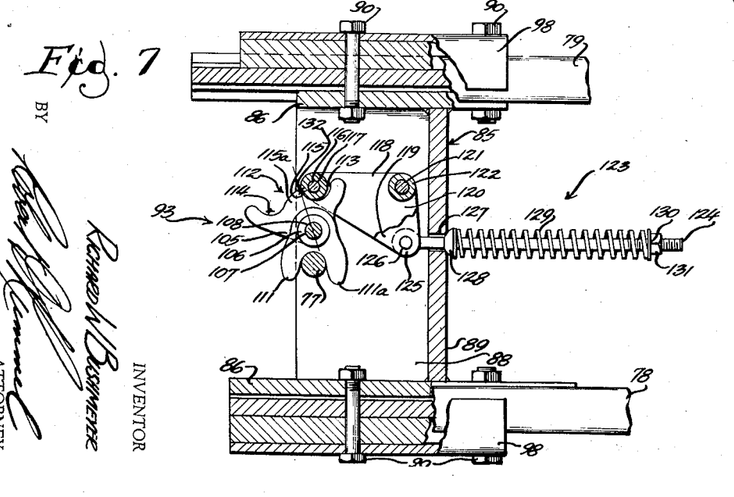
Fig. 7 is a horizontal sectional view taken on the line 7—7 of Fig. 5, with parts removed, showing the inter-engaging means when the implement is in an operative condition.
Figure 8:
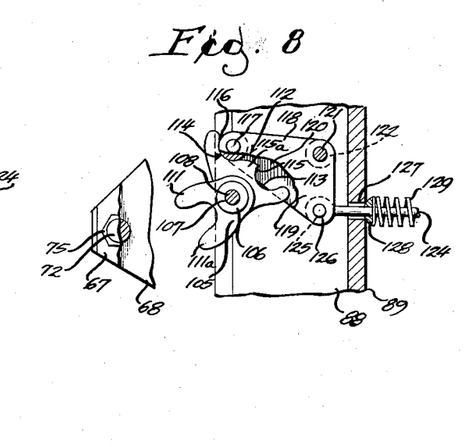
Fig. 8 is a view of certain structures shown in Fig. 7 showing the relationship of the parts immediately after a "break-away" has occurred.

The plate 52 has a triangularly-shaped portion 67 extending forwardly of the draft beam 46 and the plate 53a has a triangularly-shaped portion 68 extending forwardly of the draft beam 46 and in vertical alignment with respect to the portion 67, refer to Fig. 6. The portions 67 and 68 respectively have formed therein adjacent the forward ends thereof openings 69 and 70 which are positioned in substantially vertical alignment, and a sleeve 71 is carried between the respective portions 67 and 68 so as to substantially enclose the openings 69 and 70. A suitable draft pin or latch element 72 having a shoulder 73 formed thereon and a threaded portion 74 adjacent one end thereof, is inserted in the opening 70, the sleeve 71, and the opening 69 so that the threaded portion protrudes upwardly through the opening 69, and a nut or the like 75 is threaded on the threaded portion 74 so as to draw the pin upwardly sufficiently to bring the shoulder 73 in abutment with the under surface of the portion 68. The nut 75 is locked against rotation when the pin 72 is properly secured to the portions 67 and 68 by means of a suitable cotter pin or the like 76. It will be appreciated that the draft pin 72 is secured to the portions 67 and 68 in a substantially vertical position and provides an attachable draft portion 77 extending downwardly of the portion 68 for providing a draft means for draft connecting the subframe 11 to the draft beam 46 of the subframe 10 as will be more fully appreciated hereinafter.

The subframe 11 is also of fabricated construction and includes in the present instance a pair of spaced apart plow beams 78 and 79 which are downwardly curved adjacent their rearward ends for having attached thereto the plow bottoms 12 in any suitable or well-known manner. The coulters 13 are supported by means of suitable clamps 80 and 81 respectively to the respective plow beams 78 and 79 forwardly of the plow bottoms 12 in the usual manner, and a furrow wheel construction designated generally as 82 is attached adjacent the rearward end of plow beam 78 by means of a suitable attaching bracket 83 for aiding in controlling the plow when the plow is in operation in a manner well-known in the art. The forward ends of the plow beams 78 and 79 are parallel and rigidly inter-connected by means of a diagonal brace 84 and a forwardly positioned transverse brace member 85, brace member 85 being in the form of a forwardly open weldment in the present instance having side members 86, top member 87, a bottom member 88, and a rear member 89, the side members being rigidly secured between the respective plow beams 78 and 79 by means of suitable bolts or the like 90.

The top member 87 of brace member 85 extends forwardly beyond the bottom member 88 and is provided with a longitudinally extending forwardly open guideway or slot 91 having a flared opening 92 for receiving the attachable portion 77 of the draft pin 72 therein, the slot 91 being formed of a width sufficiently large to conveniently receive the portion 77 of draft pin 72 therein while still preventing any lateral play of the pin while received in the slot. Enclosed within the weldment or brace member 85 is a spring loaded latching or inter-engaging mechanism, generally designated as 93, for draft connecting the subframe 11 to the attachable portion 77 of the draft pin 72 when the portion 77 is received by the longitudinal slot 91, the latching mechanism 93 being of the type which is automatically tripped into a locking or inter-engaging position with respect to the draft pin 72 when the attachable portion 77 thereof is received in the slot 91 sufficiently to engage or trip the latching mechanism. This will be more fully explained hereinafter.

The interlocking means 15, as previously suggested, is provided between the subframe 11 and the subframe 10 for permitting lateral swinging of the subframe 11 about the axis of the pin 72 in either direction when the subframe 11 is draft connected to the subframe 10 while still stabilizing the subframe 11 with respect to the subframe 10 for causing tilting of the subframe 11 in accordance with tilting of the subframe 10 as occasioned by the adjustable screw 34. The interlocking means includes in the present instance a pair of forwardly-open stabilizing hooks 94 which are provided with forwardly extending legs 95 and 96 respectively. The stabilizing hooks 94 are secured in aligned spaced-apart relationship to the respective plow beams 78 and 79 as by bolts or the like 97, and the respective forwardly extending legs 95 and 96 are so positioned with respect to bearing plates 98, substantially angular shaped and suitably fixed to the respective plow beams 78 and 79 forwardly of the hooks 94 by the bolts 90, to form a throat portion 100 between the upper surfaces of the respective bearing plates and the respective legs 95 and 96 for snugly receiving the draft beam 46 therebetween. The stabilizing hooks 94 are so positioned on the plow beams 78 and 79 to snugly receive the draft beam 46 in the respective throat portions 100 when the subframe 11 is draft connected to the subframe 10. It will be appreciated that the draft beam 46 when received in the throat portion 100 is held against tilting independently of the subframe 11 by means of the respective legs 95 and 96, and the relatively wide-spread position of the stabilizing hooks 94 with respect to the draft beam 46 insures good stability of the subframe 11 with respect to the subframe 10 and minimizes the effect of any looseness of the draft beam 46 in the respective throat portions 100.

A socket 101, having a slot 102 formed therein, is positioned rearwardly on a diagonal brace member 103 and in longitudinal alignment with the pilot shaft 53 so as to receive the pilot shaft 53 adjacent the rearward end thereof in the slot 102 when the subframe 11 is draft connected to the subframe 10. The diagonal brace member 103 is secured, as by bolts or the like 103a, to downwardly extending brackets 103b which are secured to the respective plow beams 78 and 79 as by suitable bolts 103c. The socket 101 is welded to a supporting bracket 103d which is secured to the opposite side of member 103 as by the bolts 103a, slot 102 being positioned transversely with respect to the direction of travel of the machine. The slot 102 is formed in the present instance of a size sufficient to permit swinging movement of the subframe 11 about the axis of pin 72 to either side of the longitudinal a distance substantially equal to a swing of 5 degrees and it has been found by experimentation that in normal operation, and in usual terrain, and when operating in normal soil conditions, that the subframe 11 seldom swings to the limit permitted by the transverse slot 102. While the slot 102 is formed of a width sufficient to allow the subframe 11 to swing from side to side while still accommodating the pilot shaft 53 therein, the height of the slot is formed so as to snugly receive the pilot shaft therein and consequently prevent substantially all up and down play of the subframe 11 with respect to the pilot shaft 53 when the plow is in an operative position besides substantially supporting the rearward portion of the subframe 11 on the subframe 10 when the plow is moved into a raised position. The socket 101 is formed with a flared opening 104 opening into the transverse slot 102 and the rearward end of the pilot shaft 53 is tapered as at 104a so that the pilot shaft will be readily received in slot 102 when the subframe 11 is being draft connected to the subframe 10.

The stabilizing hooks 94 are so constituted as to permit swinging movement of the subframe 11 about the axis of the pin 72 to either side of the longitudinal to the extent permitted by the socket 101. This is accomplished in the present instance by forming the respective throat portions 100 of a length sufficient to provide space rearwardly of the draft beam 46 to accommodate the draft beam therein when the subframe 11 is swung to either side its maximum permitted amount. It will be appreciated therefore that the stabilizing hooks 94 while snugly receiving the draft beam 46 in the throat portions thereof so as to cause tilting of the subframe 11 in accordance with tilting of the subframe 10, are of a size sufficient to permit sliding movement of the draft beam therein when the subframe 11 is swung to either side about the axis of the pin 72. It will be further noted that the interlocking means 15 besides stabilizing the subframe 11 with respect to the subframe 10 against tilting independently thereof is so constituted as to permit the instantaneous separation of the subframe 11 from the subframe 10 when the inter-engaging mechanism 93 is disengaged from the attachable portion 77 of pin 72 as will be more fully appreciated presently.

The inter-engaging or latching mechanism 93, as best seen in Figs. 5, 6, 7, and 8 comprises in the present instance a trigger or draft latch element engaging means 105 having a boss 106 substantially in the center thereof, and an opening 107 formed in the boss for receiving therein a suitable pin 108. The pin 108 is in the form of a flat-headed cap screw which is received in a suitable opening 108a formed in the top member 87 of the brace member 85 and which protrudes downwardly through an opening 109 formed in the bottom member 88, and a suitable nut 110 is threaded on that portion of the pin 108 protruding downwardly from the bottom member 88 for fixing the pin 108 with respect to the member 85 in a substantially vertical position. The trigger 105 is therefore supported for swinging movement in a substantially horizontal plane, and the opposite end portions of the boss 106 are placed in bearing relationship with respect to the top member 87 and bottom member 88. The trigger 105 has formed adjacent one end thereof a pair of cooperating gear like teeth 111 and 111a, and adjacent the other end thereof a cam track or surface 112. The cam surface 112 is formed with a pair of spaced detent notches 113 and 114 and an abutment 115a having a machined abutting surface 115 which is positioned between the respective notches 113 and 114, and a suitable detent roller or cam follower 116 is carried by a pin 117 so as to be in abutting relationship with the abutting surface 115 when the plow is in an operative position as will be more fully appreciated hereinafter. The roller 116 is carried by the pin 117 adjacent the end of one leg of a bell crank 118, the bell crank 118 being formed of substantially triangularly shaped spaced plates 119 and 120 which are swingably secured adjacent one apex by means of a suitable pin or the like 121 received in a suitable spacer 122, the pin 121 being suitably fixed to the top member 87 and bottom member 88 so as to be supported in a vertical direction so that the bell crank 118 is swingable between top member 87 and bottom member 88 in a plane substantially parallel to the horizontal and substantially at right angles to the pin 108. The teeth 111 and 111a are of a size sufficient to receive therebetween the attachable draft portion 77 of the draft pin 72 when the subframe 11 is draft connected to the subframe 10 so that the draft force imposed upon the subframe 11 when the plow is in operation is transmitted to the trigger 105 by means of portion 77 of pin 72 so as to urge the trigger to swing in a clockwise or unlatching direction, as viewed in Fig. 7. For normally maintaining the trigger 105 in the position shown in Fig. 7 which is its draft engaging position, a spring arrangement 123 is connected to the other leg of the bell crank 118 and includes in the present instance a bolt 124 provided with an eye 125 which is pivotally connected between the respective plates 119 and 120 adjacent the other leg of the bell crank by means of a suitable pin or the like 126. The bolt 124 extends rearwardly through an opening 127 formed in the rear member 89 of brace 85, and a seat 128 is provided on the bolt 124 rearwardly of the rear member 89. A coiled spring 129 is fitted on the spring seat 128 so as to extend rearwardly around the bolt 124, and the spring 129 is confined on the bolt 124 by means of a suitable washer 130 and a lock nut 131 threaded on the bolt 124 so that the spring is placed under compression. The machined abutting surface 115 is formed so as to coincide with the circumferential surface of the detent roller 116, and the lateral limit of the circumferential face of surface 115 coincides with the point of tangency between the roller 116 and a line drawn through the axis of the pin 107 when the trigger 105 is in its draft position. The draft force imposed by the portion 77 of pin 72 upon the trigger 105 tending to swing the trigger 105 clockwise or in an unlatching direction is transmitted to the roller 116 by means of the machined abutting surface 115 at a point adjacent the aforesaid point of tangency, this point of tangency being designated by the number 132. The arrangement is such that the point of power transmission of the abutting surface 115 to the roller 116, which is designated as 132 as previously suggested, and the centers of the roller 116 and bell crank pivot 121 are sufficiently out of alignment to cause the bell crank 118 to swing about the axis of pivot 121 in a clockwise or unlatching direction when the force exerted by the portion 77 of pin 72 against the tooth 111 of the trigger 105 is sufficient to overcome the force exerted by the expansion of spring 129. It will be appreciated that the expansion of the spring 129 tends to maintain the trigger 105 in the position shown in Fig. 7 with the trigger in a draft position and with the tooth 111 biased against the portion 77 of the pin 72 so as to hold the sub-frame 11 in draft engagement with sub-frame 10 and with portion 77 against the rearward limit of the slot 91, the normal operating force exerted by the portion 77 against the tooth 111 being insufficient to swing the trigger 105 in an unlatching direction against the force exerted by the spring 129. When the force required to move the plow bottoms 12 through the ground exceeds a predetermined amount, the force transmitted by the machined abutting surface 115 from the portion 77 of the pin 72 to the roller 116 will be sufficient to move the bell crank 118 in a clockwise or unlatching direction against the force exerted by the spring 129 so as to release the abutting surface 115 from the roller 116 and permit the trigger 105 to swing in an unlatching direction. When the trigger 105 is moved into an unlatching position, see Fig. 8, the notch 114 is moved sufficiently to receive the pin 116 and the expansion of spring 129 biases the roller 116 against the peripheral surface of notch 114 so that the trigger 105 is so positioned that the opening between the teeth 111 and 111a substantially coincides with the entrance into the slot 91. The trigger 105 is therefore locked in this position and the only way the operator can move the trigger into a cocked or draft position is by backing the tractor sufficiently to move the portion 77 rearwardly between the teeth 111 and 111a and into the slot 91 to the rearward limit thereof. The trigger 105 is then moved into a cocked position by means of portion 77 and tractor T, the machined cam surface 115 being moved in a counter-clockwise direction sufficiently to snap into abutting relationship with respect to the circumferential surface of the pin 116. The plow is now once again in an operative position.

The facing surfaces of the teeth 111 and 111a are shaped in the form of a cycloidal projection so as to have rolling contact with portion 77, after the manner of the rolling contact which takes place between the teeth of mating gears. The tooth 111 rolls upon the circumferential surface of the portion 77 when a "break-away" has occurred between the sub-frame 10 and the sub-frame 11, and tooth 111a rolls upon the circumferential surface of the portion 77 when the trigger 105 is being moved into a cocked or draft engaging position. Since these parts will normally be subjected to a great deal of dirt and other gritty material, this tendency of the teeth 111 and 111a to roll upon the circumferential surface of the portion 77 alleviates much wear which would normally occur if there was a sliding action between these parts.

It will be appreciated that surface 115 can be of other shapes provided the point of power transmisison between the surface 115 and the roller 116 is at one side of the center line between the axis of the roller 116 and the axis of pin 121, more specifically the side towards the pin 108, so that when a predetermined force is transmitted from the surface 115 to the roller 116 sufficient to overcome the force exerted by the spring 129, the bell crank 118 will be moved in an unlatching direction sufficiently to release the surface 115 from the roller 116, the exact force required to move the bell crank 118 in an unlatching direction being determined by the amount of mis-alignment between the point of power transmission between the surface 115 and the roller 116, and the axes of the roller 116 and the pin 121, and the force exerted by the spring 129.

It being normal for the tractor to run with one tractor wheel in the last previously formed furrow and accordingly tilted to one side, it is usually necessary to adjust the right-hand hitch arm 19 to a more raised position in relationship to the tractor than the left-hand hitch arm 20 so that as the tractor tilts the plow will run level. This is accomplished as previously suggested by means of the link 21 which is in the form of the adjustable screw 34 which the operator from his station on the tractor can shorten sufficiently by turning handle 38 in the proper direction to cause the hitch arm 19 to swing upwardly sufficiently to move the draft beam 46 into a substantially horizontal position when the tractor is tilted. The interlocking means 15 between subframe 11 and the subframe 10 stabilizes the subframe 11 with respect to the subframe 10 as previously suggested so that the subframe 11 is tilted in accordance with tilting adjustment of the draft beam 46. It will be appreciated that the depth of the furrow is determinative of the amount of tilt imposed on the tractor, and the amount of movement imparted to the hitch arm 19 by means of the adjustable screw 34 in order to move the draft beam 46 into a substantially horizontal plane is completely under the control of the operator from the operator's station on the tractor and while the plow is in operation. As is well known, the amount of tilt of the tractor, and consequently the amount of adjustment, will vary with each change in the depth of the plow.

As previously described, the extent to which the subframe 11 is permitted to swing from side to side about the axis of draft pin 72 is controlled by the pilot shaft 53 and the slot 102 of the socket 101, the throat portions 100 of the inter-locking means 15 being formed of a size sufficient to permit this swinging movement without bringing the draft beam 46 into contact with the rear limit of a respective throat portion when the subframe 11 is swung to its greatest extent in one direction. If the sub-frame 11 is swung in one direction its maximum permitted amount, say for instance to the left as viewed in Fig. 4, the top member 87 of the brace 85 will exert a force against the portion 77 of the draft pin to the right, and since the portion 77 is received snugly with respect to lateral movement in the longitudinal slot 91, this reaction against the portion 77 will not be reflected in the inter-engaging mechanism 93 in such a way as to tend to swing the trigger 105 in an unlatching direction and consequently will not cause a "break-away" between the sub-frame 11 and the sub-frame 10. It will be further appreciated that if the throat portions 100 of the interlocking means 15 were employed for providing the limits for the sideward swinging movement of the subframe 11 about the axis of pin 72, that the force reaction against the portion 77 of the pin 72 when the sub-frame 11 was swung to its greatest extent in either direction, would be reflected against the inter-engaging means 93 and would tend to move the trigger 105 in an unlatching direction so as to cause in some instances a "break-away" between the subframe 11 and the subframe 10. In some circumstances this would be undesirable and it does not occur when the permitted swinging movement of the subframe 11 is controlled by the socket 101 as in the present instance.

To draft connect the sub-frame 11 to the sub-frame 10 so as to put the plow P in an operative position with respect to the tractor T, the operator first vertically positions the draft beam 46 of the sub-frame 10 in substantially horizontal and longitudinal alignment with respect to the throat portions 100 of the interlocking means 15, the pilot shaft 53 being in longitudinal alignment with the slot 103 formed in the socket 101. The operator then upon backing the tractor sufficiently rearwardly, causes the draft beam 46 to be pushed into the throat portions 100 of the interlocking means 15, the portion 77 of the draft pin 72 being moved into the longitudinal slot 91 formed in the top member 87 of brace 85 sufficiently to be received between the respective teeth 111 and 111a of the trigger 105. Upon further movement rearwardly of the draft beam 46 by means of the tractor, the portion 77 is moved rearwardly to the rearward limit of the longitudinal slot 91 and the trigger 105 is moved into a cocked or draft position with respect to the portion 77, the rearward portion of the pilot shaft 52 being received by the slot 102 formed in the socket 101. The plow P is now in an operative position and is adapted to be raised or lowered by means of the draft and lifting linkage 14 which is under the control of the operator as previously stated. The operator by causing the plow P to lower itself upon forward movement of the tractor, can move the plow bottoms 12 into the ground a depth established by the share suction of the plow bottoms and the line of draft between the plow bottoms and the tractor, the draft connection between the trigger 105 and the portion 77 being so positioned as to be substantially in the line of draft between the plow bottoms 12 and the tractor when the plow is in an operative plowing position. Upon the plows being moved into an operative plowing position, the tilt of the tractor, after the first furrow has been formed, will have to be compensated for so that the plow will run level when the tractor tilts. This is accomplished by means of link 21 which is in the form of adjustable screw 34 as previously described. Also during normal plowing operations the compressive force of the spring 129 is so calculated as to prevent the trigger 105 from moving in an unlatching direction. The proper compressive force of this spring can best be determined by experiment and will depend upon such things as the depth of plowing, the type and nature of the soil being plowed, the size of the plow, etc. When one of the plow bottoms 12 strikes an immovable object, the forward motion of the subframe 11 stops at the moment of impact, and the tractor and consequently the sub-frame 10 continues to move forward. The resulting abnormal force is transmitted through the portion 77 to the trigger 105 and consequently to the roller 116 of the bell crank 118 through the machined cam portion 115, and this force is sufficient to overcome the force exerted by the spring 129. The bell crank 118 is caused therefore to swing in an unlatching direction sufficiently to release the trigger 105 for movement in an unlatching direction by movement of the attaching portion 77 forwardly out of the longitudinal slot 91. The draft beam 46 and the rearwardly extending pilot shaft 52 are instantaneously releasable from the respective throat portions 100 and the socket 101 upon relative movement longitudinally between the respective sub-frames.

When the abutting portion 115 of the trigger 105 is snapped clear of the roller 116, the spring 129 urges the bell crank 118 to swing in a latching direction so that the notch 114 receives the roller 116 when the attachable portion 77 is moved by the trigger 105 into an uncocked position, the trigger 105 being locked in this uncocked position as previously described.

To recouple the subframe 11 to the subframe 10 the operator, without leaving his station on the tractor, need only back the tractor sufficiently to move the draft beam 46 into the throat portions 100 and the pilot shaft 53 into the rearward socket 101, the portion 77 being moved sufficiently rearwardly into the longitudinal slot 91 of brace 85 to move the trigger 105 into a cocked position. The plow P is once again then in an operative position, and the operator by lifting the plow over the obstruction in a manner as previously described can continue the plowing operation on the other side of the obstruction or the obstruction can be removed from the field.

A further feature of the present invention is to provide an implement which has ground working tools, such as a plow, which is draft-connected to a propelling means such as a tractor, and which is swingable from side to side when turning about a substantially vertical axis located between the axis of the rear wheels of the tractor and the ground working tools. This feature of the invention is effective for causing the plow bottom or bottoms to move so that the radius of the path of movement of each of the plow bottoms is substantially equal to the radii of the paths of movement of the rear drive wheels of the tractor when the combination is being operated in a curve, as when plowing on a contour, see Fig. 9, each of the plow bottoms therefore being caused to follow or "track" the tractor accurately and cut a ribbon or furrow of soil which is of substantially equal continuous width whether the combination is being operated on a curve or in a straight line. In prior tractor and plow combinations, such for instance as a plow in combination with a tractor embodying a linkage system of the type commonly referred to as the Ford-Ferguson linkage, each of the plow bottoms, upon the tractor's being operated on a curve such as shown in Fig. 9, will be caused to follow the tractor in such a manner as to cut a ribbon or furrow of soil which is of less width than the ribbon or furrow of soil cut by each of the plow bottoms when the combination is operated in a straight line. Conversely, if the tractor is driven in a curve to the left, opposite to that shown in Fig. 9, with the last described arrangement the plow will "cut in on the curve" and take a ribbon or furrow of soil which is wider than that cut when the assemblage is operated in a straight line. This undesirable characteristic of a tractor plow combination of this type is due to the fact that the plow is swingable in relation to the tractor about an axis located forwardly of the rear drive wheels of the tractor and adjacent the front axle thereof. Therefore, when the tractor is being operated on a curve or contour and in the direction indicated in Fig. 9, the plow will be caused to swing in a plane substantially parallel to the horizontal and in a direction away from the unplowed ground. In other words, it will be led in a curve which is sharper than that followed by the tractor and will cut a slice which is narrower than it would when running straight. Another tractor plow combination which is well-known in the art is the combination of a plow rigidly draft-connected to a tractor so that substantially all side to side swinging of the plow with respect to the tractor is prevented. In constructions such as this, each of the plow bottoms, upon the tractor's being operated on a contour and traveling in the same direction as the tractor-plow combination shown in Fig. 9, will follow the tractor in such a manner as to cut a ribbon or furrow of soil which is of greater width than the ribbon or furrow of soil cut when the combination is being operated in a straight line. This undesirable characteristic is due of course to the fact that the plow is rigidly held with respect to the tractor and that the plow bottoms are necessarily spaced a predetermined distance rearwardly of the drive wheels of the tractor. Any tractor, when executing a turn, may be considered to perform a composite movement consisting in part of lineal progress and in part of a swinging movement in the direction of the curve. Such swinging movement, if taken alone, would be about a point midway between the two traction wheels and on the center line thereof. In most tractors this would be about a vertical pivot intercepting the center line of the rear axle and midway between the traction wheels. Such a point might be considered the center of pivotal movement about which the tractor swings laterally when making a turn.

In the plow illustrative of the present invention, the tracking feature thereof can best be illustrated if we assume, firstly, that the plow carries only one plow bottom, secondly, that the soil in which the plow bottom is operating is of a uniform consistency, and thirdly, that the force of the soil against the rear land wheel 82 is negligible. Under these conditions, and assuming also that the tractor and plow combination is being operated on a contour such as shown in Fig. 9 and in the same direction as shown therein, it has been found that the resistance of the soil against the plow bottom is centered at a point adjacent the forward end of the plowshare and about which the plow can be said to perform a swinging movement when negotiating a curve, in a manner similar to the swinging of the tractor. These points are identified in Fig. 9 as 132 for the point about which the tractor swings, and 133 for the point on the plow wherein the resistance of the soil is centered and about which the plow swings. The draft pin 72 is positioned substantially halfway between the axis of the rear drive wheels of the tractor, point 132 and this point 133 on the plowshare wherein the resistance of the soil is centered. Responsive to all of these conditions, the plow bottom should be caused to track perfectly behind the tractor so that the ribbon of soil cut by the plow bottom is of the same continuous width whether the combination is being operated on a contour or in a straight line. Due to inconsistency of the texture of the soil, the point on the plowshare wherein the resistance of the soil is centered is constantly changing. Also, a certain portion of the resistance of the soil to the plow is reflected in the rear furrow wheel 82. However, these variables for all practical purposes have little or no effect upon the tracking ability of the plow when the draft pin 72 is located substantially halfway between the axis of the rear wheels of the tractor and the point on the plowshare where in the resistance of the soil is centered at substantially all times. When the plow carries two plow bottoms such as shown in Fig. 9, the center of soil resistance against both of the plow bottoms is centered in most instances somewhere between the plow bottoms and adjacent the forward end of the rear plow bottom. In this instance, considering for a moment that the soil resistance against the plow bottoms is uniform at all times and that the force of the soil against the rear furrow wheel 82 is negligible, perfect tracking of the plow bottoms behind the tractor is effected by locating the draft pin 72 halfway between the axis of the rear drive wheels of the tractor and this point between the plowshares wherein the resistance of the soil is centered. It has been found however that due to the inconsistency of the soil and due to the resistance of the soil which is reflected in the rear furrow wheel, that tracking of the plow bottoms behind the tractor for all practical purposes is effected when the pin 72 is located so as to be reasonably close to being halfway between the axis of the rear drive wheels of the tractor and the center of soil resistance between the plowshares. It will be appreciated therefore that the ability of the plow bottoms to track the tractor is predicated upon the location of the draft pin between the axis of the rear drive wheels of the tractor and the center of soil resistance between the plow bottoms, the location of this draft pin being best determined by experiment, the number of plow bottoms carried by the plow, the fact that the soil in which the plow bottoms are operated does not offer a uniform resistance to the respective plow bottoms, and the fact that a certain portion of the resistance of the soil to the plow is reflected in the rear furrow wheel being taken in consideration.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim therefore, and desire to secure by Letters Patent is:

1. A mounted implement in combination with a tractor having at the rear thereof three substantially triangularly spaced attaching elements, said implement including a draft beam adapted to be connected to said attaching elements for up and down movement and for tilting movement, an implement frame carrying at least one ground working tool, interengaging means between said implement frame and said draft beam for propelling said ground working tool by reason of the forward movement of said draft beam, said interengaging means being constituted to permit sideward swinging movement of said implement frame relative to said draft beam and to separate upon relative longitudinal movement between the draft beam and the frame in one direction and releasable upon the attainment of a predetermined load, and interlocking means between the implement frame and the draft beam for stabilizing the implement frame with respect thereto for causing tilting of the implement frame in accordance with tilting of the draft beam.

2. In a tractor-supported plow, the combination of a tractor having a rear axle, a vertically movable laterally rigid draft frame carried by said tractor adjacent the rearward end thereof and adapted to be adjustably tilted with respect to the position of said rear axle, a plow frame carrying at least one set of ground engaging tools, means for attaching said plow frame to said draft frame at a plurality of spaced points wherein said plow frame is draft-connected to said draft frame and adapted to be moved up or down or tilted in accordance with adjustment of said draft frame, one of said means including a pivot between the plow frame and the draft frame for propelling the plow frame by reason of forward movement of the draft frame, said pivot being constituted to provide sideward swinging movement of said plow frame relative to said draft frame in either direction, and another of said means comprising a rearwardly extending pilot shaft extending from said draft frame, and a socket on said plow frame for receiving said pilot shaft, said socket being elongated laterally with respect to said plow frame for limiting the sideward swinging movement of the plow about said pivot with respect to the draft frame to a predetermined limit in either direction.

3. In a tractor-supported plow, the combination of a tractor having a rear axle, a vertically movable laterally rigid draft frame carried by said tractor adjacent the rearward end thereof and adapted to be adjustably tilted with respect to the position of said rear axle, a plow frame carrying at least one set of ground engaging tools, means for attaching said plow frame to said draft frame at a plurality of spaced points wherein said plow frame is draft connected to said draft frame and adapted to be moved up or down or tilted in accordance with adjustment of said draft frame, one of said means including a pivot between the plow frame and the draft frame for propelling the plow frame by reason of forward movement of the draft frame, said pivot being constituted to provide sideward swinging movement of said plow frame relative to said draft frame in either direction and being releasable for permitting separation of said plow frame from said draft frame when the force required to move the ground working tools through the ground exceeds a predetermined amount, and another of said means comprising a rearwardly extending pilot shaft extending from said draft frame, and a socket on said plow frame for receiving said pilot shaft, said socket being elongated laterally with respect to said plow frame for limiting the sideward swinging movement of the plow frame with respect to the draft frame to a predetermined limit in either direction.

4. In a tractor-supported plow, the combination of a tractor having a rear axle, a vertically movable laterally rigid draft frame carried by said tractor adjacent the rearward end thereof constrained and adapted to be adjustably tilted with respect to the horizontal, a plow frame carrying at least one set of ground engaging tools, means for attaching said plow frame to said draft frame at a plurality of spaced points wherein said plow frame is draft-connected to said draft frame and adapted to be moved up or down or tilted in accordance with adjustment of said draft frame, one of said means including a pivot pin carried by one of the frames and pivotal engaging means carried by the other of said frames for engaging said pin for draft connecting the plow frame to the draft frame, said engaging means being also responsive to the draft force imposed thereon when the ground working tool is being drawn through the ground so as to be releasable when the force required to move the tool through the ground exceeds a predetermined amount, said pivotal engaging means being constituted to provide sideward swinging movement of said plow frame relative to said draft frame in either direction, and another of said means comprising a rearwardly extending pilot shaft projecting from said draft frame, and a socket on said plow frame for receiving said pilot shaft, said socket being elongated laterally with respect to said plow frame for limiting the sideward swinging movement of the plow frame with respect to the draft frame to a predetermined limit in either direction.

5. In a tractor-mounted implement the combination of a tractor, a draft and lifting connection between the implement and the tractor shiftable for raising and lowering the implement relative to the tractor and for leveling the implement, a draft pin carried by said draft and lifting connection, engaging means carried by said implement for draft engaging said pin for draft connecting said implement to said tractor, said engaging means being constituted to release said implement from said tractor upon the attainment of a predetermined load, said implement being permitted to swing from side to side in either direction, and interlocking means between the plow and said draft and lifting connection for stabilizing the implement with respect thereto for permitting tilting of the implement only in accordance with adjustment of the draft and lifting connection.

6. In a tractor-mounted implement the combination of a tractor, a draft and lifting connection between the implement and the tractor shiftable for raising and lowering the implement relative to the tractor and for leveling the implement, a draft pin carried by said draft and lifting connection in a substantially vertical position, engaging means carried by said implement and swingable in a plane substantially normal to the axis of said pin for draft engaging said pin for draft connecting said implement to said tractor, said engaging means being constituted to release said implement from said tractor upon the attainment of a predetermined load, said implement being permitted to swing about the axis of said pin in either direction, and interlocking means between the implement and said draft and lifting connection for stabilizing the implement with respect thereto for permitting tilting of the implement only in accordance with adjustment of the draft and lifting connection.

7. In a tractor-mounted plow the combination of a tractor having a rear axle, a laterally rigid draft and lifting connection between the plow and the tractor shiftable for raising and lowering the plow therewith relative to the tractor and tiltable from side to side relatively to the position of said rear axle for leveling the plow, a draft pin carried by said draft and lifting connection in a substantially vertical position, engaging means carried by said plow and swingable in a plane substantially normal to and about the axis of said pin for draft engaging said pin for draft connecting said plow to said tractor, said engaging means being constituted to release said pin upon the attainment of a predetermined load so as to release said plow from said tractor, said plow being permitted to swing about the axis of said pin in either direction, limiting means on said plow for abutting said draft and lifting connection when said plow is swung in either direction a predetermined distance for preventing sideward swinging of said plow in either direction beyond a predetermined limit, and interlocking means between the plow and said draft and lifting connection for stabilizing the plow with respect thereto so as to cause tilting of the plow in accordance with tilting adjustment of the draft and lifting connection.

8. In a plow for mounting attachment to a tractor having at the rear thereof three substantially triangular spaced attaching elements for the swingable attachment of hitch arms, said plow comprising a draft frame and a plow frame, said plow frame carrying at least one ground engaging tool, said draft frame being draft connected to said hitch arms, a substantially vertical draft pin carried by one of the frames, inter-engaging means carried by the other of said frames for engaging said vertical pin for draft engaging said plow frame to said draft frame, said inter-engaging means being releasable when the force required to move the ground working tool through the ground exceeds a predetermined amount, said plow frame being permitted to swing from side to side about the axis of said draft pin, a pilot shaft extending rearwardly from said draft frame, a socket carried by said plow frame for receiving said pilot shaft when the plow frame is draft connected to the draft frame and being elongated sufficiently to limit the sideward swinging movement of the plow frame with respect to the draft frame, and interlocking means between the plow frame and the draft frame for stabilizing the plow frame against tilting with respect to the draft frame, said interlocking means being constituted to permit instantaneous separation of the plow frame from the draft frame.

9. In a plow for mounting attachment to a tractor having at the rear thereof three substantially triangularly spaced attaching elements for the swingable attachment of hitch arms, said plow comprising a draft frame and a plow frame, said plow frame carrying at least one ground engaging tool, said draft frame being draft connected to said hitch arms, a substantially vertical draft pin carried by said draft frame, inter-engaging means carried by said plow frame for engaging said vertical pin for draft engaging said plow frame to said draft frame, said inter-engaging means being releasable when the force required to move the ground working tool through the ground exceeds a predetermined amount, said plow frame being permitted to swing from side to side about the axis of said attaching pin, a pilot shaft extending rearwardly from said draft frame, a socket carried by said plow frame for receiving said pilot shaft when the plow frame is draft-connected to the draft frame and being elongated sufficiently to limit the sideward swinging movement of the plow frame with respect to the draft frame, and interlocking means carried by said plow frame on opposite sides of said engaging means for receiving said draft frame for stabilizing the plow frame against tilting with respect to the draft frame, said interlocking means being constituted to permit instantaneous separation of the plow frame from the draft frame upon separation thereof.

10. In a tractor mounted plow, the combination of a tractor, a plurality of spaced links pivoted to the tractor and extending rearwardly therefrom, a draft beam rearwardly of the tractor and carried on and connecting certain of said links to each other, a mast extending generally upwardly from said draft beam and connected to the tractor by another of said links, a pilot shaft extending rearwardly from said draft beam, a plow frame disposed generally rearwardly of said draft beam, a plow bottom propelled by and supported on said plow frame, a socket on said plow frame positioned to receive said pilot shaft when said tractor is backed into attaching position, interengaging means between said draft beam and said plow frame for propelling said plow frame by reason of forward movement of said draft beam, said means being constituted to provide sideward swinging movement of said frame relative to said draft beam and to separate upon relative longitudinal movement between the draft beam and the frame in one direction and releasable upon the attainment of a predetermined load, means for raising and lowering one of the links connected with said draft beam independently of the other for tilting said draft beam relative to the tractor, interlocking means between said frame and said draft beam spaced laterally from opposite sides of said interengaging means for stabilizing said frame and tilting it in accordance with adjustment with said draft beam, said interlocking means being constituted to release upon relative longitudinal movement between said draft beam and said frame in one direction, said socket being elongated laterally with respect to said frame and said interlocking means being arranged to permit sideward swinging movement of said frame relative to said draft beam.

11. In a tractor mounted plow, the combination of a tractor, a plurality of spaced links pivoted to the tractor and extending rearwardly therefrom, a draft beam rearwardly of the tractor and carried on and connecting certain of said links to each other, a mast extending generally upwardly from said draft beam and connected to the tractor by another of said links, a pilot shaft extending rearwardly from said draft beam, a plow frame disposed generally rearwardly of said draft beam, a plow bottom propelled by and supported on said plow frame, a socket on said plow frame positioned to receive said pilot shaft when said tractor is backed into attaching position, interengaging means between said draft beam and said plow frame for propelling said plow frame by reason of forward movement of said draft beam, said means being constituted to provide sideward swinging movement of said frame relative to said draft beam and to separate upon relative longitudinal movement between the draft beam and the frame in one direction and releasable upon the attainment of a predetermined load, means for raising and lowering one of the links connected with said draft beam independently of the other for tilting said draft beam relative to the tractor, interlocking means between said frame and said draft beam spaced laterally from opposite sides of said inter-engaging means for stabilizing said frame and tilting it in accordance with said draft beam, said interlocking means being constituted to release upon relative longitudinal movement between said draft beam and said frame in one direction, said socket being elongated laterally with respect to said frame for accommodating said pilot shaft upon sideward swinging movement of the frame, said socket being constituted to abut said pilot shaft upon sideward swinging of said frame in either direction a predetermined distance for preventing sideward swinging movement of the frame beyond a predetermined limit and said interlocking means being arranged to permit sideward swinging movement of said frame relative to said draft beam within the limits allowed by said socket.

12. In a tractor mounted plow, the combination of a tractor, a plurality of spaced links pivoted to the tractor and extending rearwardly therefrom, a draft beam rearwardly of the tractor and carried on and connecting certain of said links to each other, a mast extending generally upwardly from said draft beam and connected to the tractor by another of said links, a pilot shaft extending rearwardly from said draft beam, a plow frame disposed generally rearwardly of said draft beam, a plow bottom propelled by and supported on said plow frame, a socket on said plow frame positionel to receive said pilot shaft when said tractor is backed into attaching position, inter-engaging means between said draft beam and said plow frame for propelling said plow frame by reason of forward movement of said draft beam, said means being constituted to provide sideward swinging movement of said frame relative to said draft beam and to separate upon relative longitudinal movement between the draft beam and the frame in one direction and releasable upon the attainment of a predetermined load, means for raising and lowering one of the links connected with said draft beam independently of the other for tilting said draft beam relative to the tractor, interlocking means carried by said frame and spaced laterally from opposite sides of said inter-engaging means for receiving said draft beam for stabilizing said frame and tilting it in accordance with adjustment of said draft beam, said interlocking means being constituted to release upon relative longitudinal movement between said draft beam and said frame in one direction, said socket being elongated laterally with respect to said frame and said interlocking means being arranged to permit sideward swinging movement of said frame relative to said draft beam.

13. In a tractor-mounted plow, the combination of a tractor, a plurality of spaced links pivoted to the tractor and extending rearwardly therefrom, a draft beam rearwardly of the tractor and carried on and connecting certain of said links to each other, a mast extending generally upwardly from said draft beam and connected to the tractor by another of said links, a pilot shaft extending rearwardly from said draft beam, a plow frame disposed generally rearwardly of said draft beam, a plow bottom propelled by and supported on said plow frame, a socket on said plow frame positioned to receive said pilot shaft when said tractor is backed into attaching position, inter-engaging means between said draft beam and said plow frame for propelling said plow frame by reason of forward movement of said draft beam, said means being constituted to provide sideward swinging movement of said frame relative to said draft beam and to separate upon relative longitudinal movement between the draft beam and the frame in one direction and releasable upon the attainment of a predetermined load, means for raising and lowering one of the links connected with said draft beam independently of the other for tilting said draft beam relatively to the tractor, forwardly open hooks secured to said plow frame and spaced laterally from opposite sides of said inter-engaging means for snugly receiving said draft beam for stabilizing said frame and tilting it in accordance with adjustment of said draft beam, said interlocking means being constituted to release upon relative longitudinal movement between said draft beam and said frame in one direction, said socket being elongated laterally with respect to said frame for accommodating said pilot shaft upon sideward swinging movement of the frame, said socket being constituted to abut said pilot shaft upon sideward swinging of said frame in either direction a predetermined distance for preventing sideward swinging movement of the frame beyond a predetermined limit and said interlocking means being arranged to permit sideward swinging movement of said frame relative to said draft beam within the limits allowed by said socket.

14. In a tractor-mounted plow, the combination of a tractor, a plurality of spaced links pivoted to the tractor and extending rearwardly therefrom, a draft beam rearwardly of the tractor and carried on and connecting certain of said links to each other, a mast extending generally upwardly from said draft beam and connected to the tractor by another of said links, a pilot shaft extending rearwardly from said draft beam, a plow frame disposed generally rearwardly of said draft beam, a plow bottom propelled by and supported on said plow frame, inter-engaging means between said draft beam and said plow frame for propelling said plow frame by reason of the forward movement of said draft beam, said means being constituted to provide sideward swinging movement of said frame relative to said draft beam, said plow frame having formed therein a plurality of laterally spaced longitudinally extending slots for receiving said draft beam on opposite sides of said inter-engaging means and a transverse slot formed rearwardly of said longitudinal slots and positioned to receive said pilot shaft when said plow frame is draft engaged to said draft beam, said transverse slot being of a size sufficient to permit sideward swinging movement of the plow frame in either direction to a predetermined extent, and means for raising and lowering one of the links connected with said draft beam independently of the other for tilting said draft beam relative to the tractor, said longitudinally extending slots stabilizing said plow frame and permitting tilting of the plow frame only in accordance with adjustment of said draft beam while permitting sideward swinging movement of the plow frame within the limits defined by said transverse slot.

15. In a tractor mounted plow, the combination of a tractor, a plurality of spaced links pivoted to the tractor and extending rearwardly therefrom, a draft beam rearwardly of the tractor and carried on and connecting certain of said links to each other, a mast extending generally upwardly from said draft beam and connected to the tractor by another of said links, a pilot shaft extending rearwardly from said draft beam, a plow frame disposed generally rearwardly of said draft beam, a plow bottom propelled by and supported on said plow frame, inter-engaging means between said draft beam and said plow frame for propelling said plow frame by reason of the forward movement of said draft beam, said means being constituted to provide sideward swinging movement of said frame relative to said draft beam and to separate upon relative longitudinal movement between the draft beam and the frame in one direction and releasable upon the attainment of a predetermined load, said plow frame having formed therein a plurality of laterally-spaced longitudinally-extending forwardly-open slots for receiving said draft beam on opposite sides of said inter-engaging means and a transverse slot formed rearwardly of said longitudinal slots and positioned to receive said pilot shaft when said plow frame is draft engaged to said draft beam, said transverse slot being of a size sufficient to permit sideward swinging movement of the plow frame in either direction to a predetermined extent, and means for raising and lowering one of the links connected with said draft beam indepedently of the other for tilting said draft beam relative to the tractor, said longitudinally extending slots permitting sideward swinging movement of the plow frame within the limits defined by said transverse slot and stabilizing said plow frame and permitting tilting of the plow frame in accordance with adjustment of said plow beam while still permitting instantaneous separation of said frame from said plow frame.

16. In a tractor-mounted plow the combination of a tractor, a vertically movable laterally rigid draft and lifting connection between the plow and the tractor for raising and lowering the plow relative to the tractor and tiltable in a plane substantially normal to the direction of travel for leveling the plow, pivotal inter-engaging means between the plow and the draft and lifting connection for propelling the plow by reason of the forward movement of the tractor, said means being constituted to permit sideward swinging movement of the plow relative to the draft and lifting connection, said plow having formed therein a plurality of longitudinally extending slots laterally spaced on opposite sides of said inter-engaging means and a transverse slot rearwardly of said longitudinally extending slots, means on said lifting connection engaging said longitudinally extending slots for stabilizing the plow with respect to tilting of said lifting connection, and means on said lifting connection engaging said transverse slot for limiting the sideward swinging movement of the plow in either direction to a predetermined extent.

17. In a tractor mounted plow the combination of a tractor, a vertically movable laterally rigid draft and lifting connection between the plow and the tractor for raising and lowering the plow relative to the tractor and tiltable in a plane substantially normal to the direction of travel for leveling the plow, pivotal inter-engaging means between the plow and the draft and lifting connection for propelling the plow by reason of the forward movement of the tractor, said means being constituted to permit sideward swinging movement of the plow relative to the draft and lifting connection and to separate upon relative longitudinal movement between the plow and the draft and lifting connection in one direction and releasable upon the attainment of a predetermined load, said plow having formed therein a plurality of longitudinally extending forwardly open slots laterally spaced on opposite sides of said interengaging means and a transverse slot rearwardly of said longitudinally extending slots, means on said lifting connection engaging said longitudinally extending slots for stabilizing the plow with respect to tilting of said lifting connection, and means on said lifting connection engaging said transverse slot for limiting the sideward swinging movement of the plow in either direction to a predetermined extent, the open ends of said longitudinal slots permitting instantaneous separation of the plow from the draft and lifting connection upon release of said pivotal engaging means.

18. A hitch for use in mounting a plow on a tractor said hitch comprising a plow frame element fixed on the plow and a draft frame element carried by the tractor, one of said elements providing an open ended slot and the other having an upwardly directed pivot pin engageable in the slot by backward movement of the tractor, a trigger journaled adjacent said slot and providing a recess shiftable by rotation of said trigger from a position substantially in alignment with said slot, for receiving said pin upon rearward movement of said tractor to a position transverse to said slot for retaining said pin in engagement with said slot, a notched cam track portion connected in controlling relation with said trigger and a spring pressed cam follower engaged with said cam track in one of the notches thereof positioned to hold said trigger in pin retaining relation to said slot, said cam track providing a second notch engageable with said cam follower positioned to hold said trigger in position with its recess in alignment with said slot, the first notch being of a configuration to force said cam follower out of said notch as a result of a relatively great turning moment in said trigger, and said second notch being of a configuration to force said cam follower out of said notch as a result of a relatively small turning moment in said trigger.

References Cited in the file of this patent

UNITED STATES PATENTS

| Number | Name | Date |
|---|---|---|
| 1,501,651 | Ferguson | July 15, 1924 |
| 1,529,425 | Ferguson | Mar. 10, 1925 |
| 1,859,488 | Apman | May 24, 1932 |
| 1,872,750 | Ketel | Aug. 23, 1932 |
| 2,309,750 | Carrington | Feb. 2, 1943 |
| 2,320,141 | Kott | May 25, 1943 |
| 2,430,696 | Acton | Nov. 11, 1947 |
| 2,453,197 | Clay | Nov. 9, 1948 |
| 2,602,389 | Markel | July 8, 1952 |
| 2,607,276 | Morton | Aug. 19, 1952 |
| 2,616,346 | Silver et al. | Nov. 4, 1952 |
| 2,618,213 | Welcher et al. | Nov. 18, 1952 |
| 2,713,296 | Silver et al. | July 19, 1955 |
| 2,777,376 | Schwegler | Jan. 15, 1957 |

FOREIGN PATENTS

| Number | Country | Date |
|---|---|---|
| 823,816 | Gremany | Dec. 6, 1951 |
| 469,475 | Italy | Mar. 3, 1952 |